(No Model.)

A. M. MOORE.
GEAR CASE FOR BICYCLES.

No. 517,959. Patented Apr. 10, 1894.

Witnesses.
John F. Nelson.
M. Sinclair Williams.

Inventor.
Alfred M. Moore.
by H. C. Lodge Atty.

THE NATIONAL LITHOGRAPHING COMPANY,
WASHINGTON, D. C.

UNITED STATES PATENT OFFICE.

ALFRED M. MOORE, OF MALDEN, MASSACHUSETTS, ASSIGNOR TO THE WILLIAMS & MOORE MANUFACTURING COMPANY, OF PORTLAND, MAINE.

GEAR-CASE FOR BICYCLES.

SPECIFICATION forming part of Letters Patent No. 517,959, dated April 10, 1894.

Application filed November 18, 1893. Serial No. 491,334. (No model.)

*To all whom it may concern:*

Be it known that I, ALFRED M. MOORE, a citizen of the United States, residing at Malden, in the county of Middlesex and State of Massachusetts, have invented certain new and useful Improvements in Gear-Cases for Bicycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to apparatus for protecting the mechanism, which supplies the motive power for bicycles from dust, mud or other foreign particles which by their presence not only create more friction but increase the wear of the operating parts.

My invention consists in a gear-case, so called, that is it is intended to inclose within it the sprocket wheels and chain which constitute the running gear of a bicycle.

My invention is embodied in the special form and arrangement of the several parts which go to form the gear-case as an entirety, whereby the device may be made adjustable to suit bicycles of different styles as well as to make it removable. In other words I have so constructed the various pieces, that the gear-case may be put on or taken off in a very short space of time. The various adjustments and other characteristic features will be hereinafter more fully set forth and explained.

Figure 1:
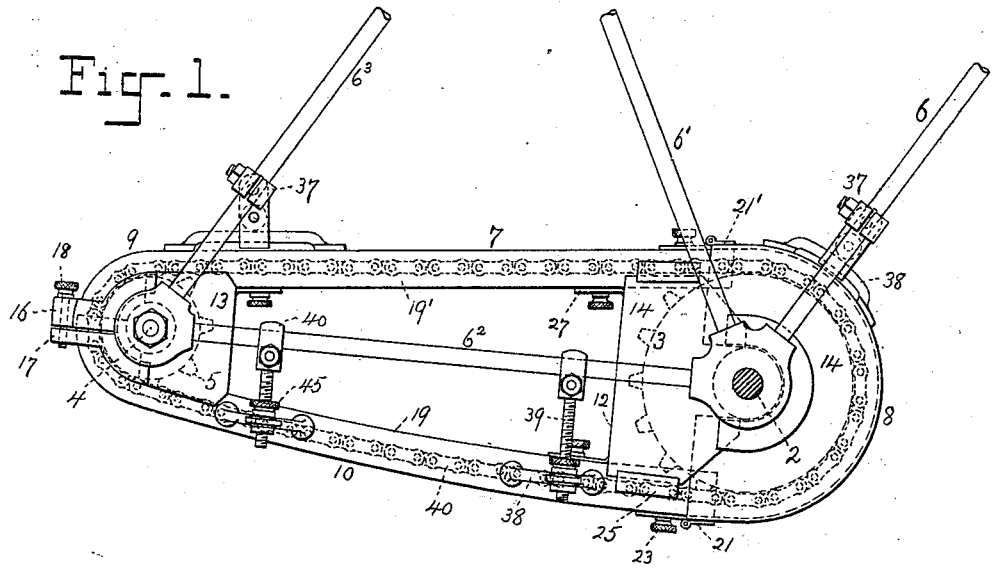
Figure 2:
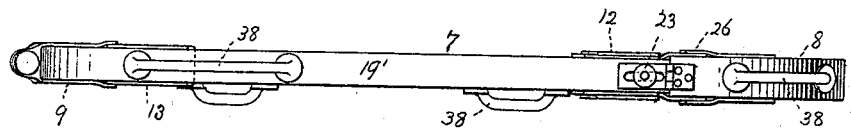
Figure 3:
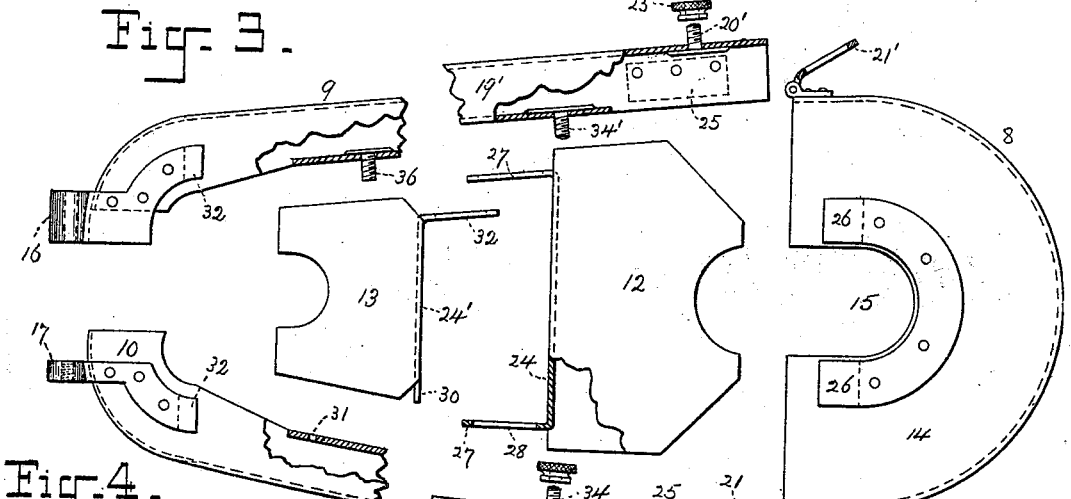
Figure 4:

The drawings herewith presented represent in Figure 1 a side elevation of a gear-case embodying my invention and applied to a bicycle frame in part. Fig. 2 is a plan view of the gear-case. Fig. 3 is a side elevation partly in section showing the several parts in their relative positions, but disconnected for purposes of description. Fig. 4 is a side and end elevation of the fastening device employed to attach the gear-case to the frame of the bicycle.

In the drawings I have indicated at 2 the crank shaft of a bicycle with driving sprocket gear at 3, the rear axle at 4 is fitted with the rear sprocket 5, while the chain 40 interconnects the two as in general.

The lower portion of the diamond frame of the machine is shown at 6 6' $6^2$ $6^3$.

The gear-case is shown as an entirety at 7 and its purpose is to inclose the two toothed wheels or sprockets as likewise the chain and thereby prevent dust or mud from lodging on the chain and being carried to the sprockets with the result that friction is very much increased and the parts wear out. By means of this gear case the parts are so completely covered that oil can be used with freedom and the friction greatly reduced. This gear-case may be composed of any thin water-proof material, as leatheroid, or it may be made from thin sheet metals, if so desired.

This gear-case is composed of five principal parts, an end piece 8 for the front sprocket and two interconnecting covers, respectively upper 9 and lower 10, which are curved at their extremities adjacent to the rear sprocket in order to serve as a cover for the latter. Inside end-closers 12, 13 co-operate with the sprocket covers to enable the gear case to be put on or taken off, while at the same time the sides of the sprockets are completely concealed. In detail these several pieces which go to make up the gear-case proper are as follows: The front sprocket is covered by a semi-circular hood 8 before alluded to which is of a width to contain said sprocket, while the central side portions 14 are recessed at 15 in order to allow the hood to pass over and yet snugly fit the hub of the sprocket. To inclose the rear sprocket, I have provided two curved covers 9, 10 which may be U shape or otherwise in cross section in part adjacent to the sprocket and are provided with end lugs 16, 17 to receive a holding screw 18. The remaining portion of said covers 9, 10 not employed in protecting the rear sprocket is made in the form of a box 19, 19' rectangular in cross section and adapted to contain the chain. To interconnect the hood 8 with these boxes 19 19' screw threaded bolts 20 20' are secured near the ends of said boxes which are of a size and shape to slide within said hood, metallic hinged plates 21, 21' rigidly attached to the hood while the free portion of these plates is slotted to engage the bolts 20 20' and are held fast thereto by nuts 23. This arrangement not only permits for end adjustment, or telescoping of the gear case to provide for different lengths of the chain but allows the hood to swing from off the sprocket and expose either the upper or lower portion thereof. As this hood conceals only about one half the sprocket leaving the sides and the other portion of the periphery exposed, closers are supplied. These closers are formed of parallel side pieces united by a connecting web 24, while the unconnected parts are adapted to straddle the hood 8 and the ends of the boxes contiguous thereto. These overlapping parts are confined beneath ears 25, on the boxes, and beneath the ears 26 on the hood. To further brace and interlock these several parts as an entirety, the web 24 is bent transversely at such an angle as will enable it to coincide with the surface of the boxes 19 19' against which this rests and is here fitted with bolts 34 34'. The offsets 27 being slotted at 28 to allow of sliding adjustment of the parts.

The closer 13 for the protection of the periphery of the rear sprocket not concealed by the covers 9. 10 acting conjointly is similar in shape to the closer for the front sprocket, except that the web 24' is fitted with a prong 30 which enters an aperture 31 in the box 19, an ear 32 engages the edges of the closer 13 which overlaps the covers 9. 10. Hence it will be understood that the several parts as above premised when united form a complete gear-case practically dust and mud proof; the outer bounding surface being made up of the end portion of the hood the top of the cover 9 and the bottom of the lower cover 10 while the inside bounding surface comprising the bottom of the box 19' the web 24, the top of the box 19 and the web 24', furthermore as the gear-case fits snugly about the hubs of the sprockets little or no foreign material can enter.

The gear-case is intended to be adjusted in position, so that the top portion of the chain will approach very closely the upper part of said case, while that of the lower portion of the chain, usually slack, is curved as shown in Fig. 1 to conform to the drop of the chain or its deviation from a straight line.

The operation of applying a gear-case embodying my invention to a bicycle is as follows: The several parts being disengaged as shown in Fig. 3. The chain is first disconnected and taken off and the ends inserted through the box portion of the covers 9. 10, which are then positioned about the rear sprocket. The chain is again united after which the hood 8 is adjusted about the front sprocket and the hinged plates inserted over the bolts 20 20' after which the nuts 23 are loosely screwed up. The bolt 18 is then employed to bring the ends of the covers 9. 10 together some elastic substance being inserted between the bosses 16. 17 to prevent rattle. This part of the gear being properly adjusted about the hub of the rear sprocket, the hood 8 is now thrust over the extremities of the boxes 19 19' until the recess 15 rests snugly about the hub of the front sprocket when the nuts 23 are screwed home. Either of the closers may now be put in place; if that for the front sprocket the overlapping edges are made to pass beneath the ears 25. 26 while the offsets 27 are inserted over the bolts 34. The closer is now pushed toward the hub of the sprocket until the desired adjustment is effected when the nuts are set up tightly. The closer for the rear sprocket is similarly positioned except that this piece is supposed to come in a fixed position every time, so that the prong 30 is made to enter the aperture 31 while the offset 35 engages the bolts 36, the overlapping edges engaging beneath the ears 32. In some instances the end-closer 13 may form a part of the upper cover 9 and this is of advantage since it reduces the number of pieces and enables the gear case to be applied more quickly. In lieu of the positive engagement of the several parts of this device adapted for endwise adjustment and intended to telescope or slide upon each other, a flexible medium after the manner of bellows may be substituted. This arrangement would serve equally well, since the parts may be moved toward or from each other while the mud and dust are excluded the chamber or space in which the operating parts move being still maintained tightly closed.

To provide for attachment of this gear case to the frame of a bicycle in order to maintain it clear at all parts from contact with the sprockets and the chain, I have provided brackets or clamps 37, shown in detail in Fig. 4, while upon the exterior surface of the gear-case are formed or affixed short offsets or rods 38. The clamps consists of a screw-threaded rod 39 furnished at one end with adjustable holding jaws 40 which grasp the frame of the bicycle. Transversely of the rod 39 are loosely mounted twin arms 41 curved at their ends to fit the offsets 38. Interposed between said arms is an adjusting nut 42 which moves upon the rod 39. A clamp-screw 45 serves to rigidly lock the outer ends of the arms from the offset and likewise upon the rod 39. In this way any desired adjustment may be effected, since the rod 39 may be moved along on the frame until opposite an offset, when movement of the nut 42 up or down upon the rod 39 gives the desired level, when the arms 41 may be swung about the rod 39 until the desired angle is attained. The curved extremities are adjusted upon the offset, the screw 45 is put home and the gear case at this point is made fast to and rigid with the frame. In the drawings Fig. 1 I have shown the gear case attached to the frame at four different points.

The advantages of this gear case are primarily that mud and dust are excluded to a great degree and enables a free use of lubricant on the gearing. Furthermore, it is capable of adjustment for every type of bicycle and is easily removable, while the sprockets are readily accessible by the removal of two or three nuts. When in position it forms a closed chamber, and since it may be made of leatheroid or other light waterproof material, it adds little or no weight to the machine while at the same time it is entirely noiseless.

What I claim is—

1. A gear-case for bicycles composed of a plurality of parts having adjustable connections so that said case may be shortened or lengthened to provide for variations in distance between two revoluble wheels, substantially as explained.

2. A gear-case, composed of a group of parts consisting of a hood, an upper cover, a lower cover, and two end closers adapted to interlock and form a chamber to contain the two sprockets and the chain of a bicycle, the said upper and lower covers being adjustably united to the said hood and said end closers, substantially as stated.

3. In combination with a hood, and two covers, upper and lower, two end closers adapted for telescopic adjustment with respect to the covers, substantially as specified.

4. In a gear-case, the combination with an upper cover in part a closed box, a similar lower cover, both curved at their adjacent ends, and means for interlocking the same, of a hood adapted to receive and slide upon the opposite extremities of said covers, two closers to engage with the covers and hood, and mechanism for adjusting and fastening together the various parts as a unit, substantially as stated.

In testimony whereof I affix my signature in presence of two witnesses.

ALFRED M. MOORE.

Witnesses:
M. S. WILLIAMS,
H. E. LODGE.